United States Patent

Lorenz

[11] 3,875,197
[45] Apr. 1, 1975

[54] AMIDO-METHYL-POLYGLYCOL FORMALS

[75] Inventor: Heiss Lorenz, Hofheim, Taunus, Germany

[73] Assignee: Hoechst Aktiengesellschaft, Frankfurt am Main, Germany

[22] Filed: July 31, 1972

[21] Appl. No.: 276,812

Related U.S. Application Data

[63] Continuation of Ser. No. 841,112, July 11, 1969, abandoned.

[30] Foreign Application Priority Data

July 15, 1968 Germany............................ 1768928

[52] U.S. Cl. .......... 260/404, 260/404.5, 260/484 R, 260/485 R, 8/116.3, 8/127.6, 8/129, 117/135.5, 117/139.5, 117/143, 252/8.15, 252/357
[51] Int. Cl. ............................................. C09f 1/00
[58] Field of Search........................ 260/404, 404.5

[56] References Cited
UNITED STATES PATENTS

| | | | |
|---|---|---|---|
| 2,294,435 | 9/1942 | Wolf | 260/404 |
| 2,361,185 | 10/1944 | Engelmann et al. | 260/404 |
| 2,380,043 | 7/1945 | Hochwalt | 260/404 |
| 2,393,202 | 1/1946 | Stegemeyer | 260/404 |
| 2,477,346 | 7/1949 | Pikl | 260/404 |
| 2,796,401 | 6/1957 | Matuszak et al. | 260/615 A |
| 2,838,573 | 6/1958 | Matuszak et al. | 260/615 A |
| 2,878,294 | 3/1959 | Kress | 260/615 A |

FOREIGN PATENTS OR APPLICATIONS

| | | | |
|---|---|---|---|
| 567,128 | 1/1945 | United Kingdom | 260/404 |
| 698,922 | 12/1964 | Canada | 260/404 |

OTHER PUBLICATIONS

Weaver et al., "Stearamidomethyl Ethers," (1951), J. Org. Chem., 16, pp. 1111–1116, (1951).
Farbwerke Hoechst A.G., "Amidomethyl Formals of Polyglycols," (1970), CA 74, No. 31561v, (1971).

*Primary Examiner*—Glennon H. Hollrah
*Attorney, Agent, or Firm*—Curtis, Morris & Safford

[57] ABSTRACT

Amido-methyl-polyglycol-formals of the formula

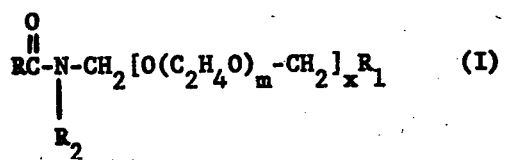

wherein R represents an alkyl or alkenyl radical containing 8 to 21 carbon atoms, $R_1$ represents hydroxyl or the radical

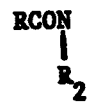

$R_2$ represents hydrogen or one of the radicals

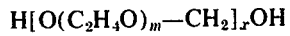

$m$ and $x$ each represent integers of 1 to 20. The compounds may be prepared by reacting fatty acid amides with formaldehyde and glycol formals of the formula $$H[O(C_2H_4O)_m-CH_2]_xOH \quad (II)$$

wherein $m$ and $x$ have the meaning given above. The compounds are useful as detergents, emulsifiers and softening agents for textiles and for reactions with textiles to produce a hydrophobic effect.

10 Claims, No Drawings

AMIDO-METHYL-POLYGLYCOL FORMALS

This is a continuation, of application Ser. No. 841,112, filed July 11, 1969, now abandoned.

The present invention relates to amido-methyl-polyglycolform-aldehyde-acetals of the general formula

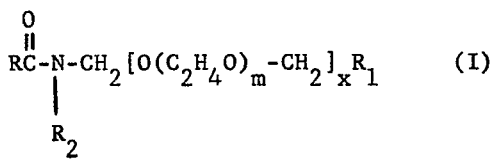

wherein R represents an alkyl or alkenyl radical containing 8 to 21 carbon atoms, $R_1$ represents hydroxyl or the radical

$R_2$ represents hydrogen or one of the radicals —$CH_2OH$ or

—$CH_2[O(C_2H_4O)_m$—$CH_2]_x$—$R_1$ $m$ represents an integer of from 1 to 20, preferably of from 2 to 10, and $x$ represents an integer of from 1 to 20, preferably of from 1 to 10, and to a process for preparing them.

It is known that fatty acid amides or carbamic acid esters of fatty alcohols can be reacted with formaldehyde and alcohols to yield the corresponding amido-methyl ethers. Thus, for example, Weaver, Schuyten et al. (J. org. Chem. 16 (1951), page 1111) have prepared the stearamido-methyl ethers of methanol, ethanol and octanol.

According to the invention there is provided a process for the manufacture of a new type of compounds which comprises reacting fatty acid amides, the alkyl or alkenyl radicals of which contain 8 to 21 carbon atoms, with formaldehyde and a glycol formal of the general formula

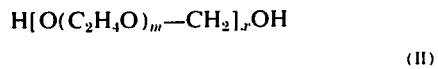

wherein $m$ and $x$ have the meaning given above, under splitting off of water. More particularly, the process is carried out in a weakly acid medium, preferably at a pH-value of from 2 to 6 and at temperatures in the range of from about 100° to 140°C. In the process of the invention, there may be used for each amide group of the fatty acid amide about 1 to 2 moles of formaldehyde, an excess of formaldehyde being of no consequence, and up to about 2 moles of the glycol-formal of the formula II. The glycol formal used in the reaction which may be built up from one or a plurality of about up to 20 glycol-formaldehyde or polyglycolformaldehyde units, indicated hereinafter as glycol-formal units, must be used in such quantities that at least one glycol-formal unit is present for each amidehydrogen atom. If a polyglycol-formal consisting of a plurality of such glycol-formal units is used, such a polyglycol-formal may be added split at the formal groups into individual glycol-formal units and added by transacetalization, onto several amido-methylol groups of the fatty acid amides.

The process of the present invention may be carried out by stirring thoroughly a mixture of the fatty acid amide or carbamide, formaldehyde or, preferably, para-formaldehyde, and the glycol-formal of the formula II, at about 100° to 120°C, and adjusting the mixture to a pH value of about 2 to 6 by addition of an organic or inorganic acid or of an acid exchanger resin, and removing the water formed during the reaction by distillation at 100° to 140°C, advantageously while passing nitrogen through the reaction mixture.

For the process of the invention, there may be used as fatty acid amides, for example the amides of caprylic acid, lauric acid, stearic acid, behenic acid, lauroleic acid, oleic acid, erucic acid or linoleic acid. As N-mono-alkyl-urea compounds, there may be used, for example, the reaction products of urea with the fatty amines obtained from the above-mentioned fatty acids. As carbamic acid esters, there may be used those which are derived from fatty alchols containing 8 to 21 carbon atoms, for example from octyl alcohol, dodecyl alcohol or octadecyl alcohol.

As glycolformals of the formula II, there may be used compounds with up to 20, preferably with up to 10 ethyleneglycol-ether units per molecule, which have been acetalized with formaldehyde according to generally known processes. The formals of diethylene-glycol or triethylene-glycol are preferably used. For the preparation of the polyglycolformals of the formula II by acetalization of polyglycols, the molar weight of the polyglycolformal obtained, i.e. the number of the glycolformal units in the polyglycolformal, may be influenced to the desired extent by varying the degree of dehydration during the acetalization. In this process, the molar weight of the polyglycolformal obtained is the higher, the nearer the molar ratio of the used polyglycol and formaldehyde is to the equimolar ratio of these starting components.

As glycolformals there may furthermore also be used those ethylene-glycol-formals which are obtained by polymerization of 1,3-dioxolane.

According to the chain length of the radicals R and of the polyglycolformal radicals fixed by condensation, the novel compounds of the formula I are either soluble or emulsifiable in water. The solubility in water of the products is reduced with increasing length of the radicals R and it is increased with increasing length of the polyglycolformal radicals.

The new amido-methyl-polyglycolformals can be utilized as detergents, emulsifiers and softening agents for textiles, and can be be split at the formal groups by heating, by an acid medium or by catalysts. The particular advantage in the use of these compounds as textile softening agents is based on this fact that the amido-methyl-polyglycolformals can be split, since it is thus possible to fix, by transacetalisation, the fission products of the amido-methyl-polyglycolformals on a reactive substrate, for example on cellulose fibers. When using, for example, those polyglycol formals of the formula I wherein R represents an alkyl or alkenyl radical containing 16 to 21 carbon atoms, for example, the polyglycolformals which are derived from stearic acid amide, palmitic acid amide or behenic acid amide, of the analogous fatty alcohols or of the corresponding fatty amines, very good hydrophobic effects are obtained when such fission products are fixed on textiles from native or synthetic fibers containing reactive groups.

The following examples illustrate the present invention but they are not intended to limit it thereto.

EXAMPLE 1 a. 106 g (1 mol) of diethylene glycol were dispersed in 300 ml of benzene by vigorous stirring. Then, 20 g of a H⁺-ion exchanger in acid form and 33 g (1.1 mol) of para-formaldehyde were added. The mixture was heated under reflux boiling and the water formed by the acetalization was removed together with the benzene by distillation. With proceeding reaction, the product became soluble in benzene. When water did no longer pass over, the ion exchanger was filtered off and the benzene was distilled off. A colorless oil was obtained which solidified after a short time, to form a white mass and had no smell of formaldehyde. Yield: 114 g of polydiglycolformal, having a molar weight of 1200. Content of formaldehyde: 23.4%.

b. 90 g of this polydiglycolformal were stirred at 100°C for 20 minutes together with 27 g of stearic acid amide and 3.5 g of para-formaldehyde, the mixture was then adjusted to pH 3 by means of concentrated hydrochloric acid and stirred for 90 minutes at 125°C, while passing through nitrogen and removing the water by distillation. A clear homogeneous liquid was formed which solidified upon cooling and gave a clear solution when dissolved in water. The product was found to be an excellent emulsifier for paraffin and waxes.

EXAMPLE 2

12 g of the polydiglycolformal obtained according to Example 1, paragraph a), were heated to 110°C for 20 minutes together with 27 g of stearic acid amide and 4.6 g of paraformaldehyde, the mixture was adjusted to pH 2 by means of concentrated hydrochloric acid and stirred for 40 minutes, at 130°C., while passing through nitrogen and removing the water by distillation. A clear liquid formed from the initially inhomogeneous reaction mass, which liquid solidified upon cooling and formed a stable milky emulsion in water. If cotton fabric was impregnated with a 5 percent aqueous solution of this product to which solution 10 g per liter of ZnCl₂ had been added, a very good water-repellent effect was obtained after heating the fabric to 140°C for 5 minutes.

EXAMPLE 3

120 g of the polyethyleneglycol having a molar weight of 600 were stirred, at temperatures in the range of from 100 to 120°C, for 2 hours, with 6 g of paraformaldehyde and 1 g of p-toluene-sulfonic acid, the reaction water being removed by distillation and nitrogen passing through. To the polyethyleneglycolformal there were added 54 g of stearic acid amide and 14.4 g of para-formaldehyde and the whole was stirred for 1 hour at 125°C. A product which was clear after melting was obtained, it solidified upon cooling and gave a completely clear solution when dissolved in water. It was found to be an excellent emulsifier for paraffins..

EXAMPLE 4

80 g of polyethyleneglycol having a molar weight of 600 were stirred for 2 hours, at 100° to 120°C, with 6 g of paraformaldehyde and 1 g of p-toluene-sulfonic acid, the reaction water being removed by distillation and nitrogen being passed through. To the polyethyleneformal obtained, there were added 54 g of oleic acid amide and 7 g of para-formaldehyde and the whole was stirred for 1 hour at 125°C. The product which was clear after melting was dissolved in water in colloid form. When the product was dissolved in benzene and isopropanol and washed several times with sodium chloride solution, the condensation product containing a proportion of 49 percent by weight of polyethyleneglycol, which could be split in an acid medium, was obtained from the benzene phase in the yield of 82 percent by weight.

EXAMPLE 5

34 g of behenic acid amide were melted on, at 110°–120°C, with 55 g of polydiglycol-formal having a molar weight of 1200. To the clear melting, there were added, by stirring at 110°C, 4.5 g of para-formaldehyde, and the temperature of 110°C was kept for 40 minutes, while stirring. Then, about 0.1 ml of concentrated hydrochloric acid were added dropwise, whereupon a pH of 3–4 was obtained. While nitrogen was passed through, the temperature was raised to 125°–130°C in order to remove the water formed during the reaction. The reaction mass was maintained at this temperature for 1 hour, while stirring. A clear reaction product was obtained, to which 400 ml of absolute alcohol were added, it was then shortly boiled, filtered and allowed to crystallize. After recrystallization from alcohol a product of the following data was obtained:

Molar weight (osmometric in benzene) 1890, calculated: 1870
| | | |
|---|---|---|
| C: found: 60.1% / 60.3% calculated | | 61% |
| H: found: 9.6% / 9.5% calc. | | 9.8% |
| N: found: 1.4% / 1.3% calc. | | 1.5% |
| free formaldehyde found: 0.8% calc. | | 0% |
| bound formaldehyde found: 15% calc. | | 16% |

Thus an accordance with the following constitutional formula $$C_{21}H_{43}CONHCH_2(OC_2H_4OC_2H_4OCH_2)_{10}-NHCOC_{21}H_{43}$$

was obtained.

We claim:

1. An amido-methyl-polyglycol formal of the formula

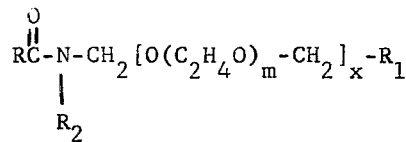

wherein R represents alkyl or alkenyl of 8 to 21 carbon atoms, R₁ represents the hydroxyl group or the radical

R₂ represents hydrogen or one of the radicals —CH₂OH or —CH₂[O(C₂H₄O)ₘ—CH₂]ₓ—R₁ and m and x represent an integer of 1 to 20.

2. An amido-methyl-polyglycolformal according to claim 1 wherein m is 2 to 10 and x is 1 to 10.

3. An amido-methyl-polyglycolformal according to claim 1 wherein $R_1$ is the radical

4. An amido-methyl-polyglycolformal according to claim 3 wherein R is $C_{17}H_{35}$.
5. An amido-methyl-polyglycolformal according to claim 3 wherein R is $C_{17}H_{33}$.
6. An amido-methyl-polyglycolformal according to claim 3 wherein R is $C_{21}H_{43}$.
7. A process for making an amido-methyl-glycol formal which comprises mixing an alkyl or alkylene amide of 8 to 21 carbon atoms, formaldehyde and a glycol formal containing from 1 to 20 ethoxy units and from 1 to 20 methoxy units, and heating the mixture at an elevated temperature to remove water therefrom and form said amido-methyl glycol formal.
8. A process according to claim 7 wherein the mixture is heated at a temperature of 100° to 150°C.
9. A process according to claim 7 wherein the mixture contains from 1 to 2 moles of formaldehyde and up to 2 moles of glycol formal per mole of amide.
10. A process according to claim 7 wherein said mixture is maintained at a pH of 1 to 6 while it is being heated.

* * * * *